Oct. 23, 1923.
R. H. McELROY
1,471,405
CLAY WORKING MACHINERY
Filed July 13, 1922
2 Sheets-Sheet 2
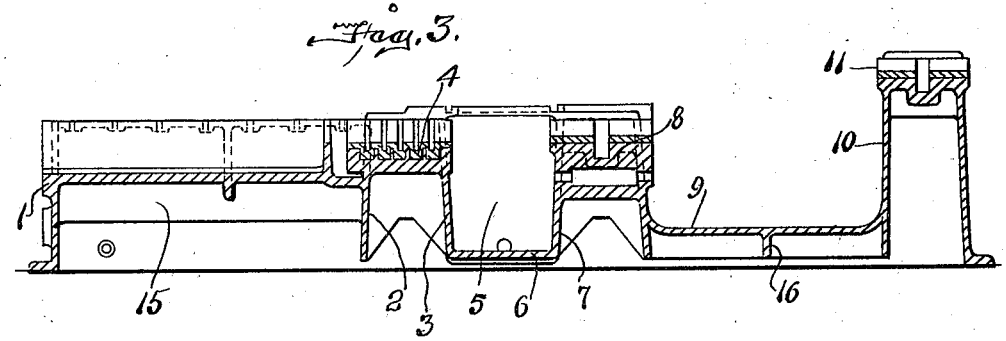
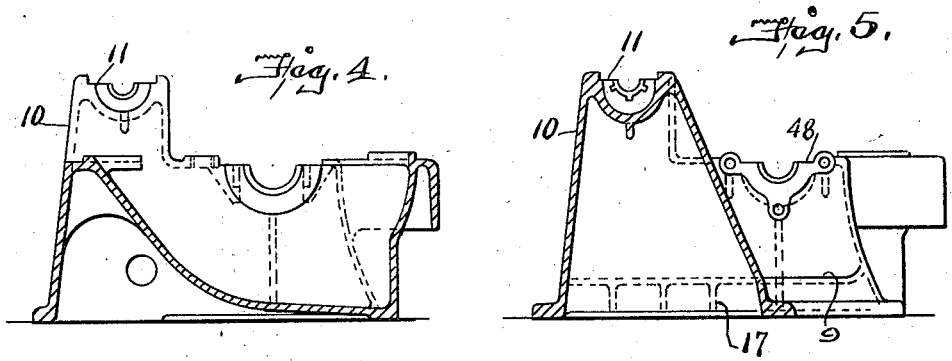
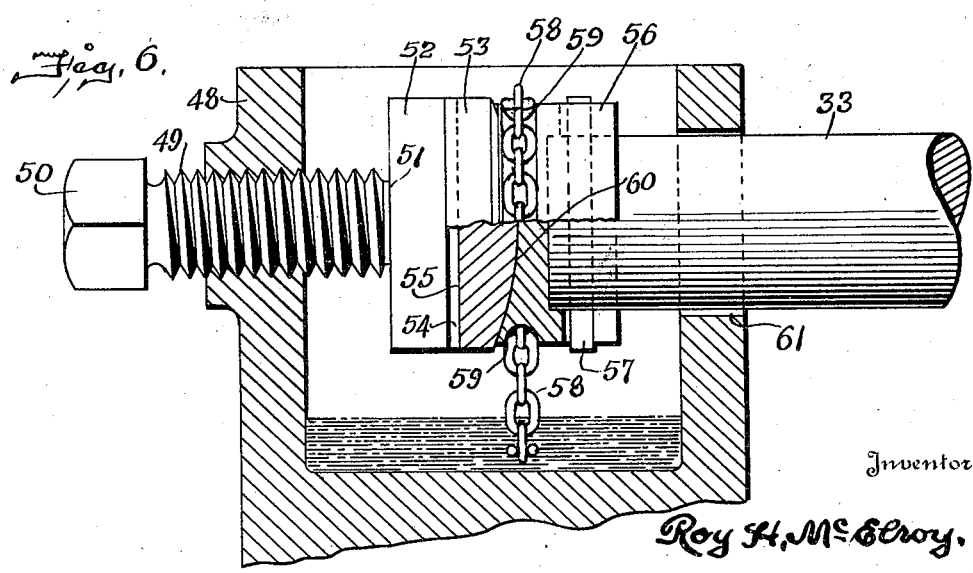
Inventor
Roy H. McElroy.
By Toulmin & Toulmin
Attorneys Patented Oct. 23, 1923.

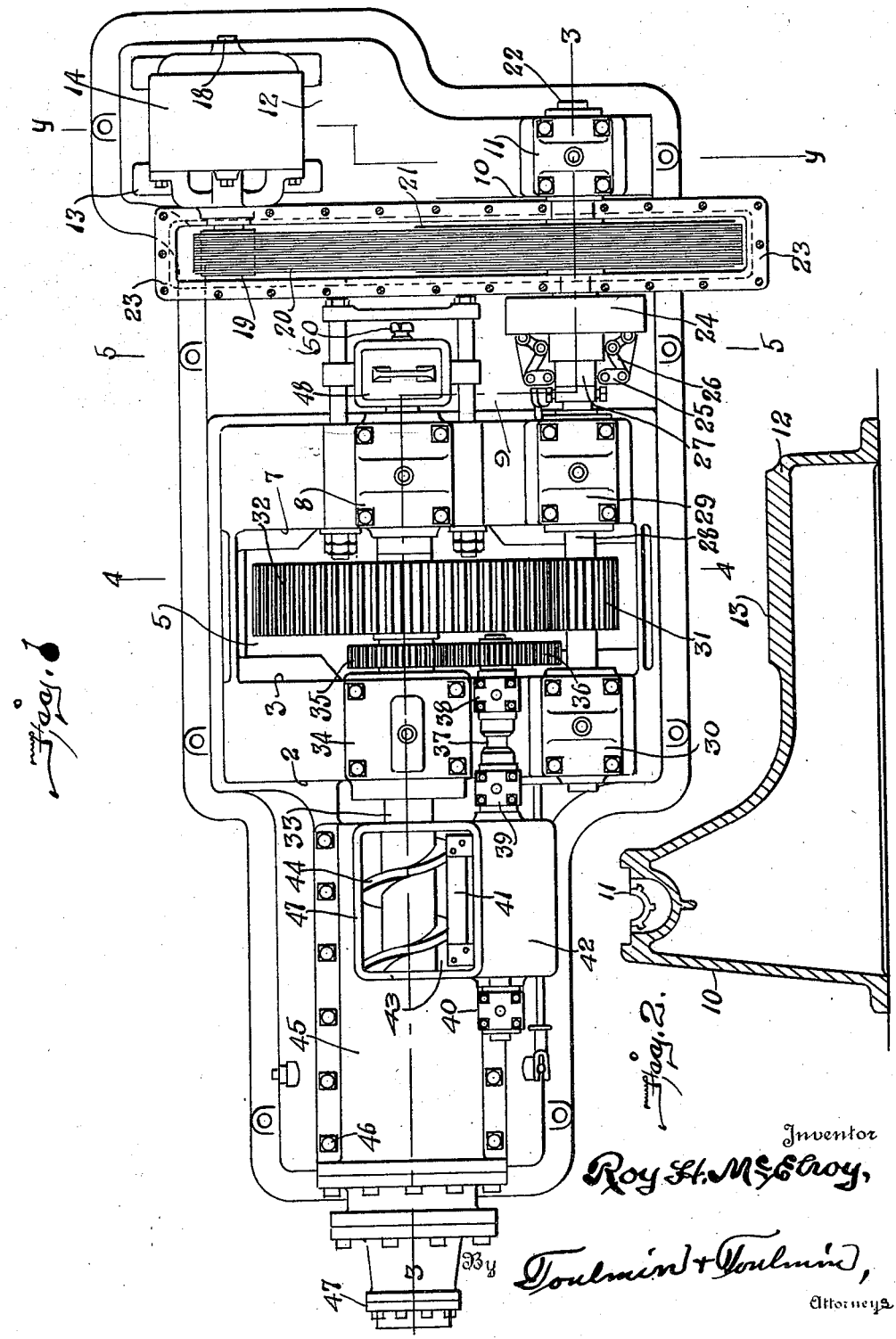

1,471,405

UNITED STATES PATENT OFFICE.

ROY H. McELROY, OF DAYTON, OHIO, ASSIGNOR TO ROY H. McELROY, RECEIVER FOR THE BOHMANN IRON WORKS CO., OF DAYTON, OHIO, A CORPORATION OF MASSACHUSETTS.

CLAY-WORKING MACHINERY.

Application filed July 13, 1922. Serial No. 574,682.

*To all whom it may concern:*

Be it known that I, ROY H. McELROY, a citizen of the United States, residing at Dayton, in the county of Montgomery and State of Ohio, have invented certain new and useful Improvements in Clay-Working Machinery, of which the following is a specification, reference being had therein to the accompanying drawing.

My invention relates to clay working machinery and in particular to a machine for extruding plastic material.

It is the object of my invention to provide a machine for the purpose of extruding plastic material after it has been thoroughly mixed for extrusion through a die of predetermined size.

Such a machine is subjected to very great strain resulting in the warping of the machine, the movement of its parts out of alignment, heavy wear upon the bearings of the driving mechanism, and difficulty in maintaining the proper alignment of the power drives. A machine of this character works under conditions where there is a large amount of flying dust and very considerable moisture leading to the destruction of belts and the like mechanism.

Furthermore, such a machine is installed in clay working plants where skilled mechanics for handling machinery of this character and installing it are rarely available, making it necessary for the manufacturer of such machinery to furnish suitable mechanics for the installation of it.

It is the object of my invention to provide a machine all the parts of which will be mounted upon a single base casting, including the power unit.

It is the further object to provide such a machine that shall be self contained, may be completely built including the power unit at the factory and may be shipped to the user complete so that all the user will have to do to install it will be to place it upon its cement base by a crane.

It is thus my object to eliminate all mechanical connections save the tightening of the bolts and nuts, constituting a part of the cement base, and attaching wires to the electric motor which is found on the machine of my invention.

It is a further object of my invention to provide a dust proof drive, thus eliminating the bolts and the like and eliminating the contact with the driving mechanism of foreign material, moisture, and similar agencies.

It is a further object of my invention to provide a power unit and a power drive so disposed and arranged upon the single base casting that the stresses and strains set up will be equalized over the casting with a minimum of wear on the bearings.

It is an additional object of my invention to provide this single casting of arched or hollow construction with reinforcing ribs.

It is a still further object of the invention to provide a means of oiling the thrust bearing to utilize all of the oil in the housing for the bearing without permitting oil to escape through the junction point between the casing and the shaft.

It is my object to provide a means of oiling the bearing which will use the oil rather than waste it as has been heretofore the difficulty where it has been necessary to run the bearing in oil with the consequent loss of it along the shaft.

Referring to the drawings:

Fig. 1 is a plan view of the assembled mechanism on the single base casting;

Fig. 2 is a section on the line y—y of Fig. 1, showing the arrangement of the out board casting and motor support;

Fig. 3 is a section through the base casting on the line 3—3 of Fig. 1;

Fig. 4 is a section on the line 4—4 of Fig. 1;

Fig. 5 is a section on the line 5—5 of Fig. 1;

Fig. 6 is a section through the casing and partially through the thrust bearing.

Referring to the drawings in detail:

The base casting consists of a semicircular portion 1 known as the extrusion casting portion. Adjacent to this portion are the bearing support walls 2 and 3, and upon the top of these walls is mounted the support for the marine thrust bearing 4. A trough 5 is formed by the bottom 6, wall 3 and wall 7 in which the main gearing rotates. 8 is a supporting bearing for the auger shaft which carries the marine bearing. The portion 9 constitutes the connecting member for the out board bearing column 10 upon which the out board bearing 11 is mounted. It also connects with the motor base portion of the casting as at 12 which is provided with raised portions 13 upon which the feet of the motor rest. The motor 14 rests upon this portion of the mechanism.

Throughout the machine runs a central reinforcing rib 15. A number of transverse ribs 16 are provided, as well as a number of parallel longitudinal ribs 17. These ribs are generally disposed at right angles to one another and form a checkerboard structure in the base of the hollow base casting, thus forming a very rigid structure.

The motor 14 has mounted on its shaft 18 a pinion 19. This pinion drives a chain belt 20 which in turn engages with the gear 21 mounted on a shaft 22 which is supported at its outer end in the out board casting bearing 11. The chain 20 and the gears 19 and 21 are enclosed within a sealed container 23 which contains oil but will not permit the exit of the oil and is also dust proof.

It is thus possible to prevent the dust and moisture in the operating room from coming in contact with the chain or the gears and injuring them.

The line of power and the auger shaft to be hereinafter described may be broken by the clutch 24 operated by the clutch operating mechanism consisting of the toggles 25 and 26 working on the sleeve 27. This clutch may be operated by a lever or any other desired means. The shaft 28 connecting with the other side of this clutch is mounted in the bearing 29 at one side, and at the other side in the bearing 30. Upon this shaft is mounted a pinion 31 which meshes with the master gear 32 of the auger shaft 33. This auger shaft is supported at one end in the bearing 8 and at the other end in the bearing 34. Also mounted on the auger shaft is a driving gear for the impeller 35 which meshes with a similar gear 36 on the impeller shaft 37. This impeller shaft is journalled at 38, 39 and 40 upon the base casting and operates the impeller 41. This impeller is located within the impeller housing 42 and is seen partially through the hopper 43 into which the mixture is fed to be worked upon by the auger 44 also seen through the opening of the hopper. The auger 44 works in a concrete casing formed by the portion designated 1 of the base casting and the cap member 45 which is retained by the bolts 46 upon the base casting.

It will be understood that suitable liners are provided within this casing as set forth and described in Patent No. 1,450,506 issued jointly to Joseph D. Cite, Albert G. Langenkamp and myself.

On the end of the extrusion casting member is detachably mounted a die 47 which regulates the exact dimensions of the extruded plastic material.

At the other end of the auger shaft is a thrust bearing contained in the casing 48 and seen in section in Fig. 6.

It will be understood that both a marine thrust bearing and a thrust bearing of the character shown in Fig. 6 are provided for alternate or joint use in taking up the thrust on the auger shaft and the auger.

As described in said Patent 1,450,506, the thrust bearing in Fig. 6 consists of a casing 48 in which works an adjusting screw 49 with a head 50. This screw makes contact at 51 with an intermediate plate 52 which is telescoped partially within the convex thrust member 53, as indicated at 54, by having a shoulder or ridge 54 inserted in a groove 55 in 53.

The concave member which takes the thrust as to 56 is mounted in the shaft of the auger 33 by a pin 57.

I improve the construction shown in the said Patent No. 1,450,506 by providing a novel means of oiling a bearing of this type, consisting of mounting a chain 58 in a groove 59 on the surface of 56 closely adjacent to the point of unit between 56 and 53, so that the oil will be conveyed to the contact surface between 53 and 56, as at 60, lubricating this surface.

The casing 48 forms an oil tank into which the chain 58 dips, thus conveying the oil upwardly to the point desired where the oil runs along the surface of the bearing at the same time enabling me to use a small quantity of oil and to prevent the escape of the oil which inevitably occurred when the oil was heretofore brought to a level sufficient for the bearing to turn in it, because at that point, if the workmen were careless in supplying the oil, the oil would escape through the opening 61 adjacent to the shaft 33.

It will be understood that I do not desire to limit myself to the details of my invention, but comprehend within its scope such modifications as may be necessary to carry my invention into practice in other forms than I have shown it in the drawings and described it in the specifications herein.

Having thus described my invention, what I desire to claim in Letters Patent is as follows:—

1. The combination with a motor, of a shaft, belting connecting the motor and shaft, a pinion on said shaft, a second shaft, a gear on the second shaft, meshing with said pinion, an extrusion auger carried by the second shaft, an impeller positioned laterally of the auger and adjacent thereto, and means to drive the impeller from the second shaft.

2. The combination with a motor, of a shaft, belting connecting the motor and shaft, a pinion on said shaft, a second shaft, a gear on the second shaft meshing with said pinion, an extrusion auger carried by the second shaft, an impeller positioned laterally of the auger and adjacent thereto, a third shaft carrying said impeller, and gearing connecting the second and third shafts.

3. The combination with a motor, of a shaft, belting connecting the motor and shaft, a pinion on said shaft, a second shaft, a gear on the second shaft meshing with said pinion, an extrusion auger carried by the second shaft, an impeller positioned laterally of the auger and adjacent thereto, means to drive the impeller from the second shaft, said first shaft comprising a pair of alined sections and a clutch member for connecting and disconnecting said sections.

4. The combination with a motor, of a shaft, belting connecting the motor and shaft, a pinion on said shaft, a second shaft, a gear on the second shaft meshing with said pinion, an extrusion auger carried by the second shaft, an impeller positioned laterally of the auger and adjacent thereto, a third shaft carrying said impeller, and gearing connecting the second and third shafts, said first shaft comprising a pair of alined sections, and a clutch member for connecting and disconnecting said sections.

5. The combination with a motor, of a shaft, belting connecting the motor and shaft, a pinion on said shaft, a second shaft, a gear on the second shaft meshing with said pinion, an extrusion auger carried by the second shaft, an impeller positioned laterally of the auger and adjacent thereto, a third shaft carrying said impeller, gearing connecting the second and third shafts, one of said bearing members being provided with a circumferential groove, and a movable oiling device resting in said groove and depending adjacent the bottom of a reservoir.

In testimony whereof I affix my signature.

ROY H. McELROY.